United States Patent [19]
Scott et al.

[11] 3,886,972
[45] June 3, 1975

[54] CORE FLOW NOZZLE

[75] Inventors: Paul R. Scott, Houston, Tex.; Victor J. Chavez, New Orleans, La.; Vitold R. Kruka, Houston, Tex.

[73] Assignee: Shell Oil Company, Houston, Tex.

[22] Filed: Dec. 6, 1973

[21] Appl. No.: 422,249

[52] U.S. Cl. .................. 137/602; 137/13; 137/604
[51] Int. Cl. ..................... F17d 1/16; F16k 19/00
[58] Field of Search ........... 137/604, 602, 88, 111, 137/13; 138/41; 158/27.4; 239/303, 310, 340, 398, 486; 302/14; 222/134, 67, 129.2, 136, 145, 68; 417/183

[56] References Cited
UNITED STATES PATENTS

| | | |
|---|---|---|
| 1,118,865 | 11/1914 | Johnston et al. .............. 137/604 X |
| 1,838,903 | 12/1931 | Buschow ........................ 137/604 X |
| 2,682,277 | 6/1954 | Marshall et al. ............... 137/602 X |
| 2,794,447 | 6/1957 | Spitz ................................ 137/604 |
| 3,154,103 | 10/1964 | Davis et al. ..................... 137/604 X |
| 3,357,598 | 12/1967 | Kraft .............................. 137/604 X |
| 3,643,688 | 2/1972 | Minert ............................ 137/604 X |

FOREIGN PATENTS OR APPLICATIONS

| | | |
|---|---|---|
| 1,003,068 | 2/1957 | Germany ........................... 137/604 |

*Primary Examiner*—Martin P. Schwadron
*Assistant Examiner*—Robert J. Miller
*Attorney, Agent, or Firm*—Fredrik Marlowe

[57] ABSTRACT

A nozzle having a variable area ratio mixing section for a pipeline transporting a viscous liquid as a core surrounded by an annulus of less viscous liquid.

10 Claims, 8 Drawing Figures

CORE FLOW NOZZLE

BACKGROUND OF THE INVENTION

Some crude oils and petroleum products are difficult to transport by pipeline unless treated in a manner to reduce flow resistance. One method which is being used successfully is to transport a viscous oil as a core surrounded by an annulus of water in a pipeline. In the prior art, a mixing section for forming core flow is employed having a fixed ratio of areas through which the oil and water pass into the oil-water mixing section. When the oil velocity is greater than the water velocity at the point of contact, the oil core has a tendency to spiral into the pipeline and disrupt core flow. When the oil velocity is lower than that of water, the core tends to break up into segments, likewise disrupting core flow.

The present invention overcomes the above described difficulties and provides a successful solution to those problems of the prior art, as will be apparent from the following description thereof.

SUMMARY OF THE INVENTION

The primary purpose of this invention resides in providing a nozzle for establishing a stable flow of a viscous fluid core, such as a hydrocarbon, surrounded by an annulus of less viscous fluid, such as water. The viscous core material may also be a paste-like material containing both liquid and solid components which are either organic or inorganic. Similarly, the low viscosity fluid may be water or low viscosity liquid hydrocarbon.

The above purpose has been achieved through the utilization of a nozzle having a variable area ratio mixing section for establishing annular core flow.

The apparatus of this invention broadly extends to a nozzle for establishing core flow of a viscous and/or waxy fluid inside an annulus of a less viscous fluid comprising a tubular body having two chambers, the first chamber having an inlet for a viscous fluid and the second chamber having an inlet for a low viscosity fluid, the second chamber having a conical taper at one end disposed away from the first chamber, a tubular member axially aligned within the two chambers, one end of the tubular member being located within the first chamber and being open to admit viscous fluid thereinto, the other end of said tubular member being disposed adjacent the conical taper of said second chamber and being axially movable within said chamber to restrict the flow of low viscosity fluid, and means for axially moving the tubular member within the two chambers.

Within the framework of the above described apparatus, the present invention not only solves the above mentioned problems of the prior art, but also achieves further significant advantages as will be apparent from the description of preferred embodiments following.

DESCRIPTION OF THE PREFERRED EMBODIMENTS

In accordance with the present invention, a nozzle is provided for establishing a stable core flow of a viscous or waxy oil surrounded by an annulus of water in a pipeline. The nozzle has a variable area ratio mixing section whereby adjustments can be made to avoid situations where the oil velocity is greater than the water velocity at the point of contact, so that the oil core has a tendency to spiral into the pipeline, or where the oil velocity is lower than that of the water, so that the core tends to break up into segments, neither of these conditions being desirable. The nozzle of this invention allows a change in the water-to-oil ratio in order to first, change the flow rate of the mixture, second, better utilize the low viscosity fluid and/or third, increase or decrease throughput. By use of the device described hereinafter, the velocities of the two fluids can be matched when the water-to-oil ratios are between about 1:1 and about 0.1:1.

Several desirable features are incorporated into the oil-water mixing nozzle of this invention: (1) the design of the nozzle for the viscous or waxy fluid can be utilized for the development of a flat velocity profile; (2) the velocity of the low viscosity annular fluid, normally water, can be changed to match the velocity of the viscous fluid by changing the cross-sectional area of the exit, whereby the operator can then match the velocities of the two fluids, thereby aiding in the immediate establishment of stable core flow; (3) the cross-sectional area of the mixing section beyond the point of contact of the two fluids can be gradually reduced, thereby suppressing turbulence, increasing the mean velocity and generally aiding in the establishment of stable core flow; and (4) the mixing section can be disassembled for cleaning, inspection and/or for exchange of parts, and the end of the viscous fluid nozzle can be inspected and kept cleaned to reduce turbulence at the interface between the fluids.

Figure 1:
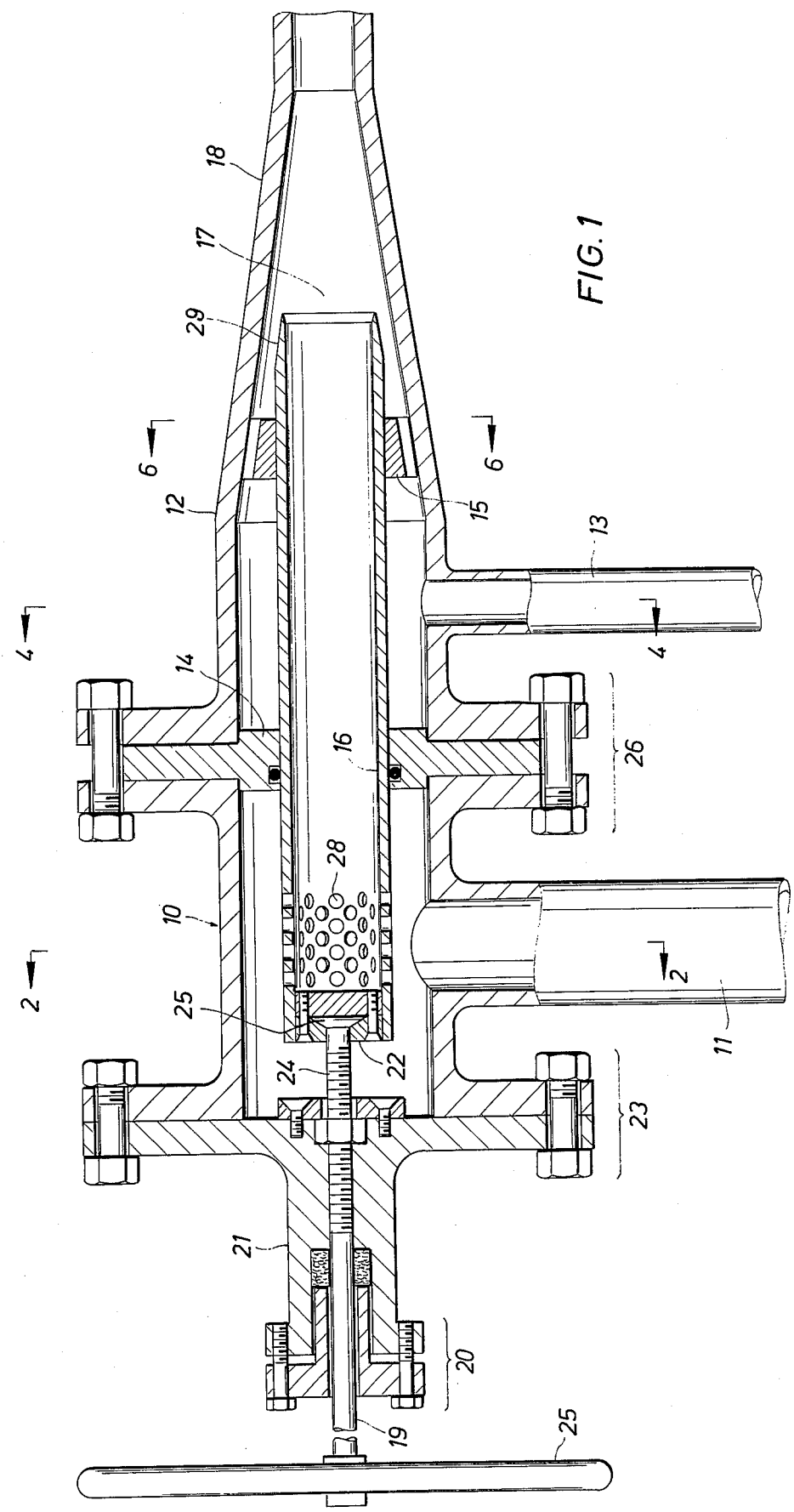
FIG. 1 is a cutaway view illustrating the nozzle of the present invention.
Figure 2:
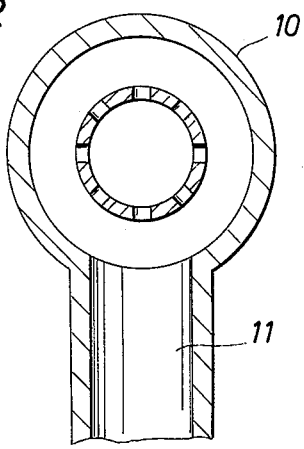
FIG. 2 is a cross-sectional view along the lines 2—2 of FIG. 1.

The core flow mixing section shown in FIG. 1 includes a tubular body composed of a first chamber 10 having a lateral inlet 11 for a viscous and/or waxy hydrocarbon such as crude oil and a second chamber 12 attached to and aligned with the first chamber 10 and having lateral inlet 13 for a substantially less viscous fluid such as water. Chambers 10 and 12 are divided by a transverse diaphragm 14. This diaphragm is fixed within the tubular chambers in the position shown and is formed with an axially aligned opening which forms a sealing bearing for the sliding movement of tubular member 16, the opposite sliding movements of which conversely varies the velocity of the less viscous fluid such as water entering the chamber 12 and proceeding to a mixing zone 17, provided by the end of tubular member 16 and a contracting exit portion 18 which is formed as an extension of the conical converging wall of chamber 12.

The hollow cylindrical valve member or valve plunger 16 is moved longitudinally relative to the tubular chambers 10 and 12 by means of a valve stem 19 extending through a stuffing box construction 20 secured to a closure member 21, which in turn, is fixed to the left-hand end of the chamber 10 by a flange construction 23. The valve stem 19 has its right-hand end secured to an end diaphragm or closure member 22 secured to the tubular member or plunger 16. Stem 19, secured to plunger 16 by oversized head 25 which is revolvable within closure member 22, has threads 24 which make plunger 16 axially movable by means of T-bar 25 within the chambers 10 and 12.

Figure 3:
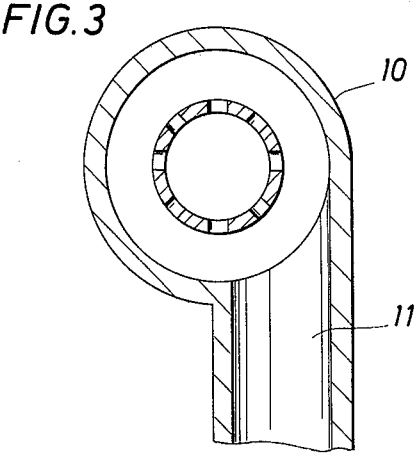
FIG. 3 is a variation of FIG. 2.
Figure 4:
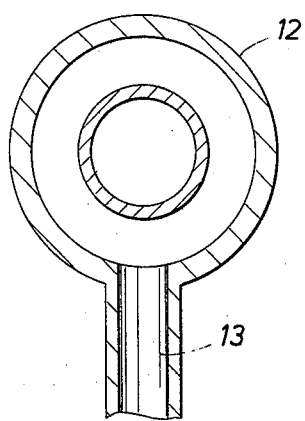
FIG. 4 is a cross-sectional view along the lines 4—4 of FIG. 1.
Figure 5:
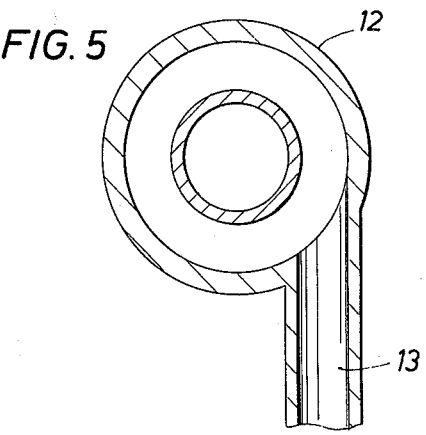
FIG. 5 is a variation of FIG. 4.
Figure 6:
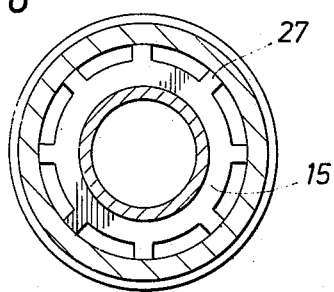
FIG. 6 is a cross-sectional view along the lines 6—6 of FIG. 1.
Figure 7:
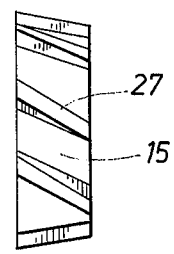
FIG. 7 is a side view of FIG. 6.

The axially aligned diaphragm 14 is preferably located in a preferred position within chambers 10 and 12. Thus, diaphragm 14 is secured by a flange construction 26 at the interface of tubular bodies 10 and 12. Flow director 15 is attached to the wall of chamber 12 and is not a solid wall but comprises angled inserts 27, shown in FIGS. 6 and 7, which are utilized to give the water stream a swirling action. To allow for horizontal movement of plunger 16, the flow director does not extend completely to plunger 16 but allows for some clearance between the two. The flow director also serves to align plunger 16. The angle of the inserts to the centerline of the valve may vary from 0° to about 45°. This swirling action stablizies the core flow and prevents penetration of the water layer by the inner oil core, and can be further enhanced by offsetting lateral inlet 13 as is shown in FIG. 5. FIG. 4 shows the alternative where the lateral inlet is centered relative to tubular body 12. The inlet 11 for the viscous and/or waxy hydrocarbon may likewise be offset as shown in FIG. 3. Since oil must first pass through orifices 28 before being admitted to hollow tube 16, the offsetting of inlet 11 effects better distribution of the oil to the orifices 28.

Figure 8:
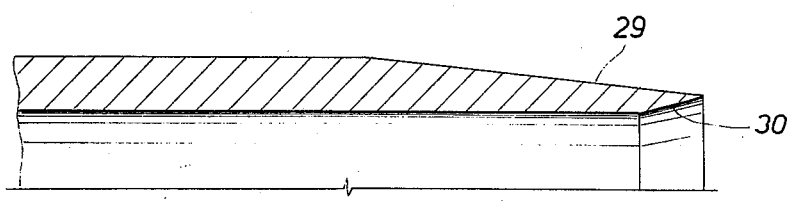
FIG. 8 is a detailed view of part of the end of the tube in FIG. 1.

The mouth of tube 16 where the viscous and/or waxy hydrocarbon is discharged into contact with the water layer preferably has a configuration as shown in greater detail in FIG. 8. Lip 29 comes to a point at the location where the oil and water first contact. The top of the lip is substantially parallel to the walls of the conical section 18 so as to cause as little disturbance to the water as possible. The inner portion 30 of the outer edge of the lip is expanded outwardly to cause the oil to be pulled forward by the water layer. The contraction of both layers by the further convergence of conical member 18 past the initial contact area further adds to the stability of the core flow because acceleration of the flow tends to suppress the formation of waves between the oil and water. To avoid wave formation, the included angle between the walls of the conical section 18 varies from about 5° to about 12° or preferably from about 7° to about 9°. The angle of inner portion 30 of the outer edge of the lip plunger varies with respect to the centerline of plunger 16 from about 5° to about 30°.

We claim as our invention:

1. A nozzle for establishing core flow of a viscous fluid inside an annulus of a low viscosity fluid comprising a tubular body having two chambers, the first chamber having an inlet for a viscous fluid and the second chamber having an inlet for a low viscosity fluid, the second chamber having a conical taper at one end disposed away from the first chamber, a tubular member axially aligned within the two chambers, one end of the tubular member being located within the first chamber and being open to admit viscous fluid thereinto, the other end of said tubular member being disposed adjacent the conical taper of said second chamber and being axially movable within said chamber to control the velocity of low viscosity fluid, means for axially moving the tubular member within the two chambers, and a flow director within the second chamber to further align the tubular member therewithin, the flow director comprising flow directing louvers disposed at an angle to impart a swirling action to the low viscosity fluid.

2. The apparatus of claim 1 wherein the viscous fluid is admitted to the tubular member through a series of orifices therein.

3. The apparatus of claim 1 wherein the first chamber is separated from the second chamber by a diaphragm which functions to axially align the tubular member within the chambers and provides a seal between the two chambers.

4. The apparatus of claim 1 wherein the viscous fluid inlet to the first chamber is offset from center to impart a centrifugal motion to the viscous fluid entering the first chamber.

5. The apparatus of claim 1 wherein the low viscosity fluid inlet is offset from the center of the second chamber to impart a swirling motion to the low viscosity fluid within the second chamber.

6. The apparatus of claim 1 wherein a lip of the tubular member is provided with converging taper.

7. The apparatus of claim 6 wherein inside taper of the lip of the tubular member varies from about 5° to about 30° with respect to the centerline of the tubular member.

8. The apparatus of claim 1 wherein the included angle of the conical section of the second chamber varies from about 5° to about 12°.

9. The apparatus of claim 1 wherein the included angle of the conical section of the second tubular body varies from about 7° to about 9°.

10. The apparatus of claim 1 wherein the angle of the louvers to the direction of flow varies from 0° to about 45°.

* * * * *